United States Patent

Leys et al.

[11] Patent Number: 5,924,441
[45] Date of Patent: Jul. 20, 1999

[54] DIAPHRAGM VALVE

[75] Inventors: John A. Leys, Stillwater; Michael A. Stein, Bloomington, both of Minn.

[73] Assignee: Fluoroware, Inc., Chaska, Minn.

[21] Appl. No.: 08/843,456

[22] Filed: Apr. 16, 1997

Related U.S. Application Data

[63] Continuation-in-part of application No. 08/712,277, Sep. 11, 1996.

[51] Int. Cl.$^6$ .................................................. F16K 11/048
[52] U.S. Cl. ................ 137/312; 137/625.5; 137/625.66; 251/335.2
[58] Field of Search ................ 137/312, 625.5, 137/625.66; 251/335.2

[56] References Cited

U.S. PATENT DOCUMENTS

| Re. 34,261 | 5/1993 | Sule ........................................ 137/625.5 |
| 3,540,478 | 11/1970 | Ito ........................................... 137/625.5 |
| 3,794,075 | 2/1974 | Stoll et al. ........................... 137/625.66 |
| 4,237,931 | 12/1980 | Rafaely ................................. 137/625.5 |
| 4,343,456 | 8/1982 | Zitzloff . |
| 4,694,848 | 9/1987 | Jorgensen et al. ............... 137/625.5 X |
| 4,766,933 | 8/1988 | Champseix et al. .................. 137/625.5 |
| 4,821,776 | 4/1989 | Ariizumi et al. ................ 137/625.5 X |
| 4,977,929 | 12/1990 | Chinnock et al. . |
| 5,002,086 | 3/1991 | Linder et al. . |
| 5,004,011 | 4/1991 | Linder et al. . |
| 5,007,458 | 4/1991 | Marcus et al. ........................ 137/625.5 |
| 5,143,118 | 9/1992 | Sule .................................. 137/625.5 X |
| 5,261,442 | 11/1993 | Kingsford et al. ...................... 137/312 |
| 5,335,696 | 8/1994 | McKenzie . |
| 5,345,857 | 9/1994 | Murphy ............................ 137/625.5 X |

FOREIGN PATENT DOCUMENTS 2840486  3/1980  Germany ............................. 137/625.5

*Primary Examiner*—Gerald A. Michalsky
*Attorney, Agent, or Firm*—Palmatier, Sjoquist, Voigt & Christensen, P.A.

[57] ABSTRACT

The invention comprises a three-way diaphragm valve. The valve has a housing having three flow ducts each leading into an open interior chamber. The open interior chamber is divided into a central chamber, an upper chamber and a lower chamber. A first valve seat is positioned between the central chamber and the upper chamber. A second valve seat is positioned between the central chamber and the lower chamber. A central valve stem assembly is slidably mounted in the valve and has a first valve member and a second valve member positioned to alternately engage the first valve seat and second valve seat respectively, to direct flow from one passageway to another. A spring bears against the valve stem assembly to bias the relative position of the valve members and valve seats in a first predetermined position. An actuator comprising a piston is slidably mounted in a piston chamber and attached to the valve stem assembly to overcome the force of the spring and move the valve stem assembly into a second actuated position. The piston may be moved by pressurized air or hydraulic fluid to automatically actuate the valve into the second actuated position. Diaphragms are integrally formed on each valve member and attached to the valve body to form a barrier or outside walls of the open interior chamber to prevent fluid from leaking from the valve. An additional diaphragm may provide secondary containment of the spring to provide additional protection against contamination of the process fluid.

6 Claims, 5 Drawing Sheets

DIAPHRAGM VALVE

This application is a continuation-in-part of the application for patent on Diaphragm Valve with Integral Diaphragms and Valve Stem, Ser. No. 08/712,277, filed Sep. 11, 1996.

BACKGROUND OF THE INVENTION

The present invention relates to valves, more particularly to diaphragm valves.

Diaphragm valves utilize a resilient diaphragm and a valve shoulder to engage a valve seat and prevent the flow of fluid past the valve seat. Diaphragm valves provide excellent sealing and isolation characteristics to contain fluid being controlled and prevent migration of the controlled fluid into the valve mechanisms or out of the valve.

In many applications, particularly in the semiconductor industry, the leakage of fluid must be strictly contained due to the corrosive nature of the controlled fluid. A diaphragm valve must be made of a material able to withstand such corrosive fluid while being capable of a large number of operations without repair or replacement. Actuators used to operate diaphragm valves are a potential location for leakage of fluid from the valve. The actuator must be sealed to prevent leakage and permit a mechanical force from outside the valve to operate the actuator.

In many applications in the semiconductor industry it is necessary to instantaneously change fluid flow to a particular process. Additionally, need arises to alternate a particular processes or equipment. This type of fluid switching can be accomplished with two two-way diaphragm valves and an external T-connection. However, when two two-way valves are used, the space requirement for mounting these valves and additional controls for separate control of each valve increases the cost of the installation.

The process fluids utilized in semiconductor processing applications may be highly costic and must be ultrapure. Contamination of these ultrapure fluids can cause catastrophic damage to wafers being processed into integrated circuits. A potential source of contamination is contact by the fluid with essentially any type of metal. Process control valves, particularly diaphragm valves, are generally capable of being manufactured of almost entirely all plastic, including fluoropolymer plastic materials. These plastic used do not contaminate the process fluids and are inert thereto. One portion of the plastic valves for which it is very difficult to replace is the metallic spring utilized to provide the normally opened and/or normally closed position of the valve. These springs are typically isolated from the fluid four courses by one of the valve members and associated diaphragms. However, failure of the single diaphragm separating the fluid flow courses from the metallic spring can cause contact with the metallic spring by the fluid and thereby cause contamination of the fluid. An additional safeguard to prevent such contamination is warranted.

SUMMARY OF THE INVENTION

The invention comprises a three-way diaphragm valve. The valve has a housing having three flow ducts each leading into an open interior chamber. The open interior chamber is divided into a central chamber, an upper chamber and a lower chamber. A first valve seat is positioned between the central chamber and the upper chamber. A second valve seat is positioned between the central chamber and the lower chamber. A central valve stem assembly is slidably mounted in the valve and has a first valve member and a second valve member positioned to alternately engage the first valve seat and second valve seat respectively, to direct flow from one passageway to another. A spring bears against the valve stem assembly to bias the relative position of the valve members and valve seats in a first predetermined position. An actuator comprising a piston is slidably mounted in a piston chamber and attached to the valve stem assembly to overcome the force of the spring and move the valve stem assembly into a second actuated position. The piston may be moved by pressurized air or hydraulic fluid to automatically actuate the valve into the second actuated position. Diaphragms are integrally formed on each valve member and attached to the valve body to form a barrier or outside walls of the open interior chamber to prevent fluid from leaking from the valve. A leak detection opening extends into the valve body and in fluid communication with the actuator and the spring chamber to detect a leakage of fluid out of the open interior chamber.

An object of the invention is to provide a diaphragm valve configured as a three-way valve and having the advantage of a piston driven actuator.

An advantage of the invention is the space required is significantly less than compared with two two-way diaphragm valves combined for the same valving effect. Additionally, an external T connection, necessary for the two two-way valve combination, is eliminated.

Another advantage of the invention is a sealing system isolates the open interior chamber from the atmosphere or the other components of the valve by an integrally molded valve member on the valve stem and a permanently attached second valve member on the valve stem, each valve member having an integrally molded diaphragm attached to the valve body sealing the open interior chamber.

Another object and advantage of the invention as configured is that all three flow ducts, as they exit the valve housing, are all coplanar facilitating installation.

Another feature of the invention is the first flow duct can be utilized as a common inlet or a common outlet.

Another advantage of the invention is that the configuration of the valve permits the device to be readily manufactured by injection molding with minimal machining after molding.

Another object and advantage of the invention with regard to the embodiments utilizing the additional spring isolation diaphragm is that an additional barrier of protection is provided to prevent contamination of the process fluids controlled by the valve.

DETAILED DESCRIPTION OF THE PREFERRED EMBODIMENTS

Figure 1:
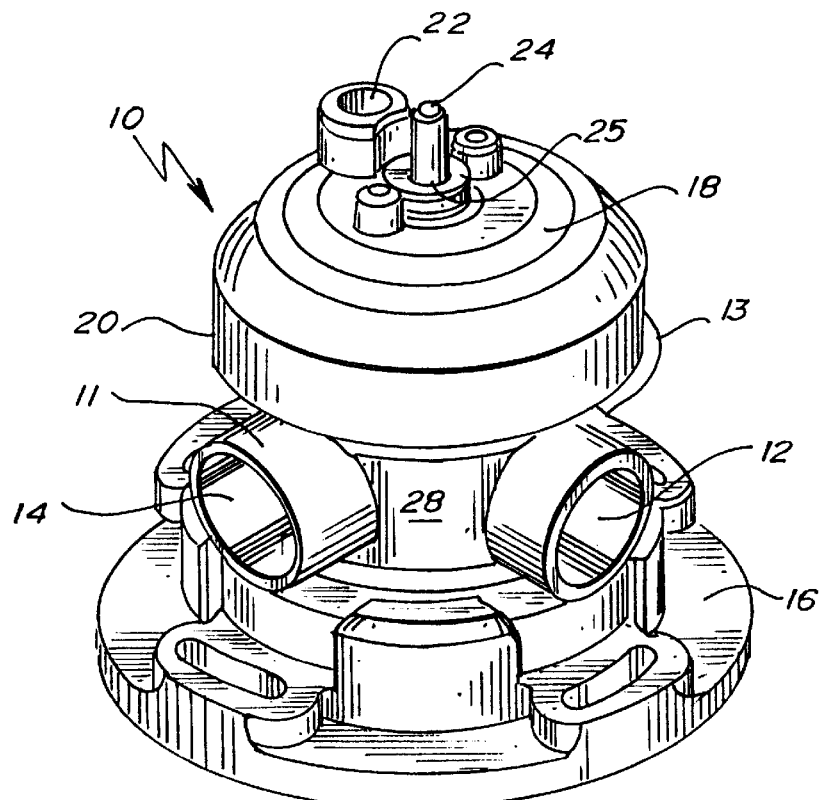
FIG. 1 is a perspective view of the three-way diaphragm valve.
Figure 2:
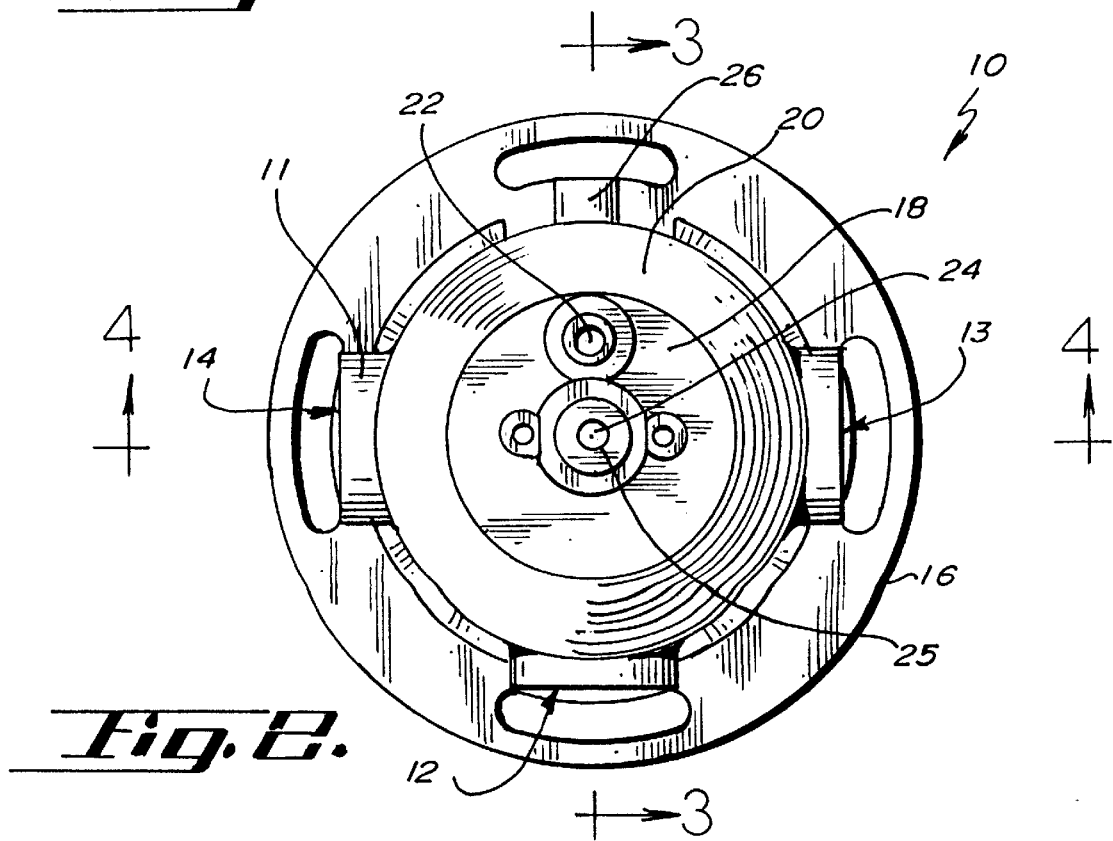
FIG. 2 is a top plan view of the three-way diaphragm valve.

Referring to FIGS. 1 and 2, the three-way diaphragm valve 10 has a housing 11 comprising a first flow duct 12, a second flow duct 13 and a third flow duct 14. The first flow duct 12 may be configured as an inlet and the second flow duct 13 and third flow duct 14 configured as outlets. The housing 11 includes a base 16 having a mounting flange 17 secured by a lower cap 80 to the body 28 and an actuator 18 secured by an upper cap 20 to the body 28. The actuator 18 comprises an inlet port 22 and an indicator opening 25 having a visual indicator 24 slidably mounted therein. As illustrated in FIG. 2, a leak detection opening 26 is formed in the housing 11.

Figure 3:
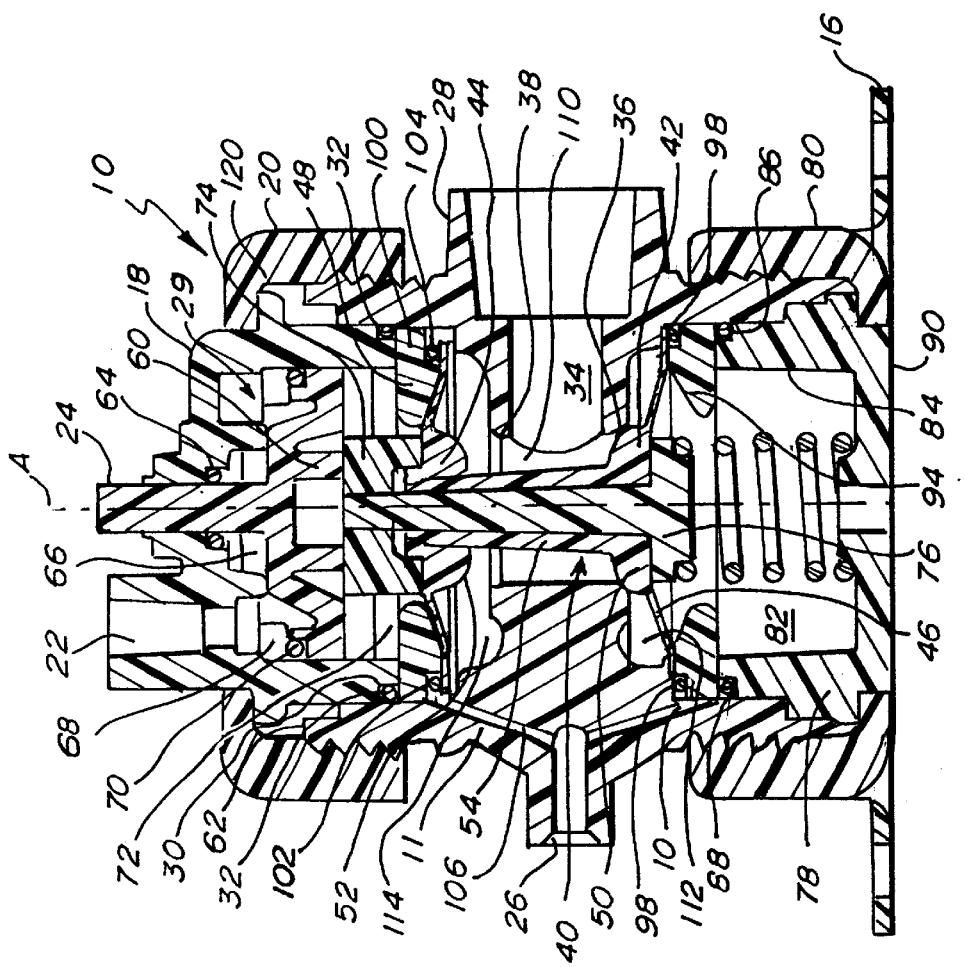
FIG. 3 is a detail section view taken at approximately 3—3 of FIG. 2.
Figure 4:
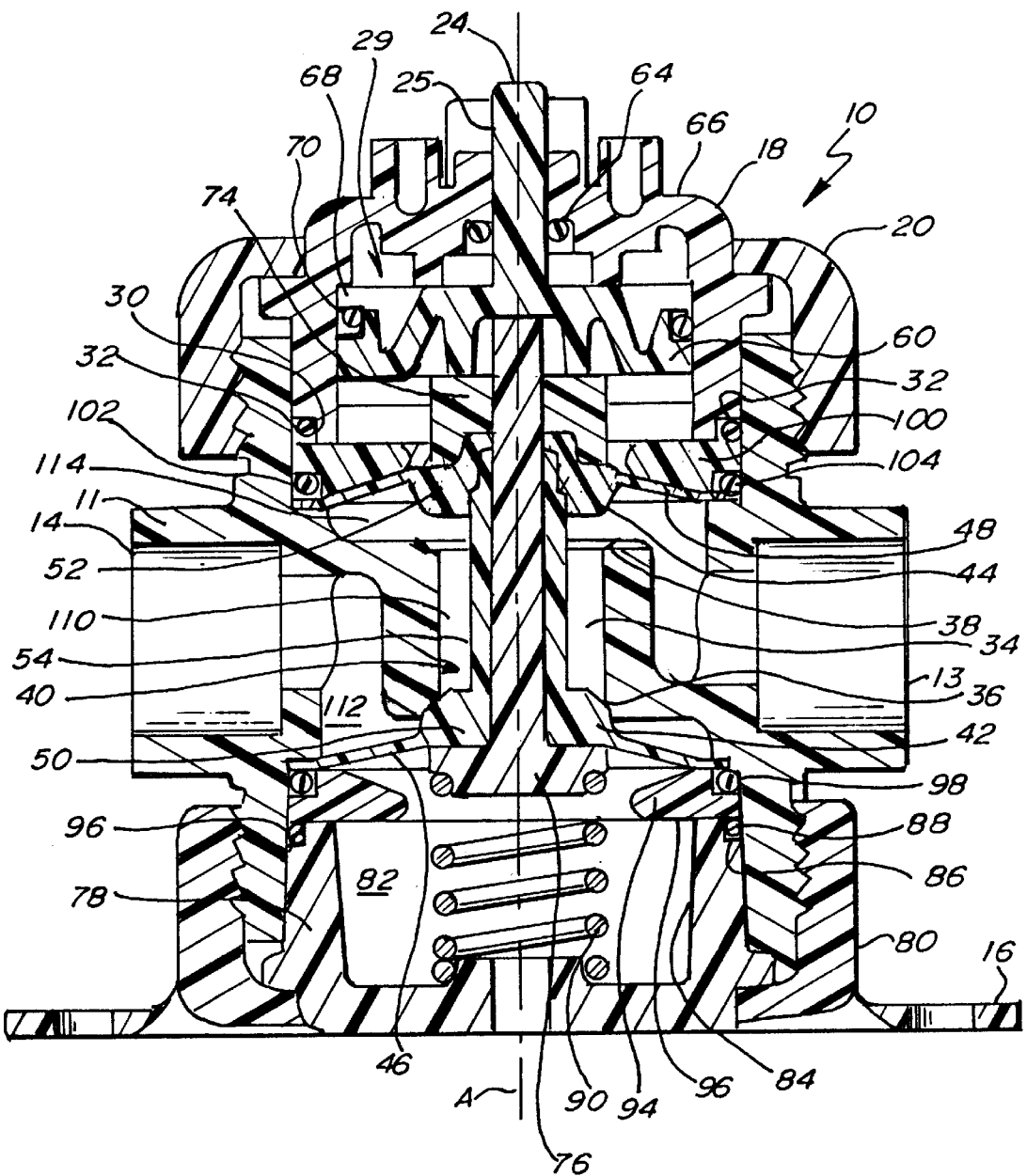
FIG. 4 is a detail section view taken at approximately 4—4 of FIG. 2.

Referring to FIGS. 3 and 4, the three-way diaphragm valve is illustrated as having a body 28 attached to the actuator 18 by the upper cap 20, a piston chamber 29 is formed in the actuator 18. The actuator 18 has a sealing channel 30 on the outside surface for holding an actuator O-ring 32 compressed between the body 28 and the actuator 18 to seal the connection between the actuator 18 and the body 28 and isolate the piston chamber 29 from the atmosphere. The body 28 defines an open interior chamber 34 in communication with the first flow duct 12. The body 28 has a first valve seat 36 and a second valve seat 38 formed coaxially around valve axis A.

Continuing to refer to FIGS. 3 and 4, a central valve stem assembly 40 is positioned coaxial to the vertical axis A in the open interior chamber 34. The valve stem assembly 40 has a first valve member 42 and a second valve member 44. The first valve member 42 has a first diaphragm 46 formed integrally thereon and extending circumferentially around the first valve member 42. Likewise, the second valve member 44 has a second diaphragm 48 formed integrally thereon and extending circumferentially about the second valve member 44. The first valve member 42 has a first valve shoulder 50 formed thereon, shown in FIG. 3, for sealingly engaging the first valve seat 36 in a closure position. The second valve member 44 has a second valve shoulder 52 thereon for sealingly engaging the second valve seat 38. The first valve member 42 and second valve member 44 are connected by a hollow valve stem 54.

Continuing to refer to FIGS. 3 and 4, the actuator 18 comprises a piston 60 slidably mounted in the actuator 18 and sealingly bearing against an inner cylindrical wall 62 on the actuator 18. The piston 60 is connected to the visual indicator 24 and further connected to the valve stem assembly 40 for moving the valve stem 54 axially along valve axis A to alternately urge the first valve seat 36 to engage the first valve member 42 or the second valve seat 38 to engage the second valve member 44 in a closure position. The actuator 18 has an indicator sealing ring 64 mounted in an annular channel around the visual indicator 24 to sealingly bear against the indicator 24 and isolate the upper piston chamber 66 from the atmosphere. An annular channel 68 is formed in the piston 60 having piston O-ring 70 mounted therein to bear against the inner cylindrical wall 62 to sealingly separate a lower piston chamber 72 from the upper piston chamber 66. A nut 74 is engaged with the piston 60. A bolt 76 extends through the valve stem 56 at bore 122 (FIG. 5) to threadably engage the nut 74.

Continuing to refer to FIGS. 3 and 4, The base 16 may include a spring housing 78 attached to the body 28 by the lower cap 80. The spring housing 78 has a bottom 81 and sidewalls 84 defining a spring chamber 82. An annular channel 86 is formed in the outer surface of the sidewalls 84 and a spring O-ring 88 is mounted in the annular channel to sealingly engage the body 28 to seal the spring chamber 82 from the outside atmosphere. The lower cap 80 may threadably engage the body 28 for retaining the spring housing 78 in place. A spring 90 is positioned in the spring chamber 82 to bear against the bottom 81 and the valve stem assembly 40 to bias the position of the central valve stem assembly 40 into a nonactuated predetermined first position as shown in FIGS. 3 and 4.

Continuing to refer to FIGS. 3 and 4, the first diaphragm 46 and the second diaphragm 48 are sealingly engaged to the body 28 to define and contain fluid in the open interior chamber 34. A lower sealing ring 94 may be positioned between the spring housing 78 and the body 28 to hold the edge portion 116 (FIG. 5) of the first diaphragm 46 between the lower sealing ring 94 and the body 28. The lower sealing ring 94 may have a notch 96 formed along the outer periphery of the lower sealing ring 94 for positioning a first hold-down O-ring 98. The first hold-down O-ring 98 seals between the lower sealing ring 94 and the body 28 and may engage the edge portion 118 of the first diaphragm 46 to secure the first diaphragm 46 between the first hold-down O-ring 98 and the body 28. The force exerted by the lower cap 80 on the spring housing 78 compresses the first hold-down O-ring 98 to retain the first diaphragm 46 sealingly separating the open interior chamber 34 and the spring chamber 82. The first diaphragm 46 forms a bottom outside wall of the lower chamber 112.

Continuing to refer to FIGS. 3 and 4, an upper sealing ring 100 may be positioned between the actuator 18 and the body 28 in a substantially similar manner to the lower sealing ring 94. The upper sealing ring 100 may have a notch 102 formed along the outer periphery of the upper sealing ring 100 for positioning a second hold-down O-ring 104. The second hold-down O-ring 104 provides a sealing connection between the body 28 and the upper sealing ring 100. The edge portion 118 (FIG. 5) of the second diaphragm 48 may be retained between the upper sealing ring 100 and the body 28 to sealingly separate the open interior chamber 34 and the actuator 18. The edge portion 118 of the second diaphragm 48 may be held between the second hold-down O-ring 104 and the body 28. The second diaphragm 48 forms the top outside wall of the upper chamber 114.

Referring to FIG. 3, a leak detection channel 106 is formed in the body in fluid communication with the spring chamber 82 and the lower piston chamber 72. The leak detection channel 106 extends to the leak detection opening 26 formed in the outside of the body 28. As illustrated in FIG. 4, the leak detection channel 106 may extend through the lower sealing ring 94 to allow the leak detection opening 26 to have fluid communication with the spring chamber 82. Furthermore, as illustrated in FIG. 4, the leak detection channel 106 may extend through the upper sealing ring 100 to allow fluid communication between the leak detection opening 26 and the lower piston chamber 72.

Referring to FIGS. 3 and 4, the open interior chamber 34 is further divided into a central chamber 110, a lower chamber 112 and an upper chamber 114. The central chamber 110 is proximate to the central valve stem assembly 40 and in communication with the first flow duct 12. The lower chamber 112 is separated from the central chamber 110 by the first valve seat 36. The upper chamber 114 is separated from the central chamber 110 by the second valve seat 38. The valve stem assembly 40 moves axially in the body 28 along axis A to urge the first valve member 42 to closingly engage the first valve seat 36 or alternately the second valve member 44 to closingly engage the second valve seat 38.

Referring to FIG. 4, the upper chamber 114 is in fluid communication with the second flow duct 13. The lower chamber 112 is in fluid communication with the third flow duct 14. When the valve stem assembly 40 is in a nonactuated first predetermined position, the first valve member 42 bears against the first valve seat 36 to sealingly separate the central chamber 110 from the lower chamber 112 preventing fluid from flowing between the first flow duct 12 and the third flow duct 14. The second valve member 44 is spaced from the second valve seat 38 allowing fluid communication between the central chamber 110 and the upper chamber 114 permitting fluid to flow between the first flow duct 12 and the second flow duct 13. A driving force such as pressurized air, pressurized water or hydraulic fluid may be applied to the media port 22, pressurizing the upper piston actuator chamber 66, urging the piston 60 to overcome the force of the spring 90 and urge the central valve stem assembly 40 downwardly along axis A toward the spring chamber 82 urging the first valve member 42 to separate from the first valve seat 36 allowing fluid communication between the first flow duct 12 and the third flow duct 14. Likewise, the axial movement of the piston 60 in the actuator 18 along the vertical axis A will urge the second valve member 44 to a closure position with the second valve seat 38 closing fluid communication between the first flow duct 12 and the second flow duct 13.

Figure 5:
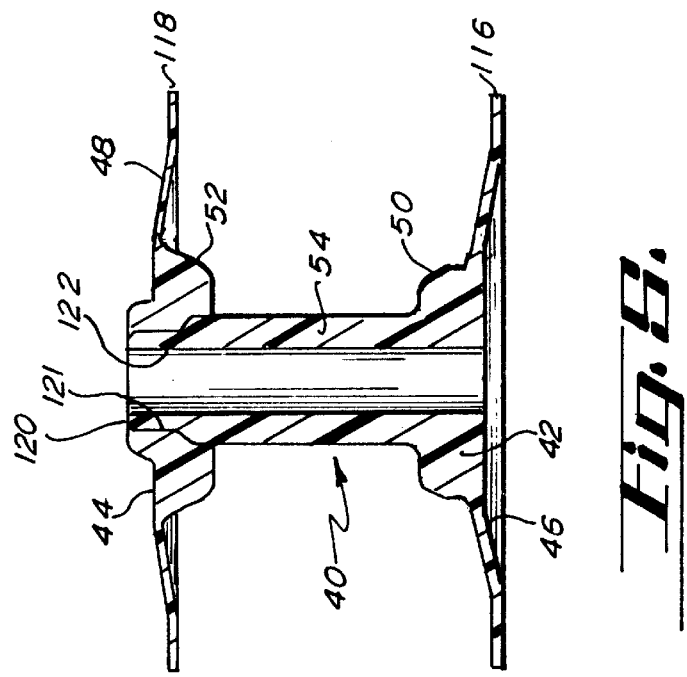
FIG. 5 is a side elevational view of the valve stem assembly.

Referring to FIG. 5, the central valve stem assembly 40 is illustrated removed from the valve 10. The central valve stem assembly 40 comprises a first valve member 42 integrally molded with a hollow stem 54. A first valve shoulder 50 and a first diaphragm 46 are integrally molded with the first valve member 42. The first diaphragm 46 has an edge portion 116. The second valve member 44 may be molded separately from the first valve member 42 and hollow stem 54. The second valve member 44 comprises a second diaphragm 48 and a second valve shoulder 52. The second diaphragm 48 has an edge portion 118. The second valve member 44 has a central bore 120 which is sized to fit over the hollow stem 54. The central bore 120 may be concentric with the edge portion 118 of the second diaphragm 48. The second valve member 44 may be non-removably attached to the hollow stem 54 by welding or an adhesive at surface 121 forming a one piece valve stem assembly 40. The hollow stem 54 is inserted into the central bore 120 to position the first valve member 42 coaxial with the second valve member 44 around the hollow stem 54. The hollow stem 54 has a bore 122 for accepting the bolt 76 which may be used to connect the central valve stem assembly 40 to the piston 60.

In operation, referring to FIGS. 3 and 4, the valve body 28 may be formed from a Teflon® material such as Dupont PFA 445. The valve stem assembly 40 may be formed from a Teflon® material such as Dupont PFA 450. The bolt 76 may be formed from a carbon fiber pultruded PEEK, polyetherether-ketone material. The O-rings, such as first hold-down O-ring 98, piston O-ring 70, and body sealing rings 32, 88, may be formed of a Viton® encapsulated PFA, perfluoroalkoxy. The spring 90 is formed from a stainless steel having a fluoropolymer coating. The actuator 18, upper cap 20, spring housing 78 and lower cap 80 having the base 16 thereon may be formed from a PVDF, poly vinylidene fluoride such as available from KYNAR. Each of these materials is specially engineered to resist corrosion and reaction with chemicals used in the industry such as the semiconductor industry. Alternative materials may be used at the discretion of an individual.

Continuing to refer to FIGS. 3 and 4, the valve 10 is assembled by placing the hollow stem 54 having the first valve member 42 integrally molded thereon in the valve body 28. The second valve member 44 is placed on the valve stem 54 and permanently attached to the valve stem 54 at central bore 120 of the second valve member 44 by welding or an adhesive or similar means known in the art of connecting plastic members together. The second hold-down O-ring 104 is placed on the upper sealing ring 100. The upper sealing ring 100 is placed proximate to the upper chamber 114 having the second hold-down O-ring 104 bearing against the edge portion 118 of the second diaphragm 48. The piston 60 having the nut 74 attached, is positioned to allow the bolt 76 to extend through the bore 122 and threadably engage the nut 74 for attaching the central valve stem assembly 40 to the piston 60. The actuator is placed on the body 24 and sealingly attached by the upper cap 20 and O-ring 32 engaging the body 28. The upper cap 20 has an engagement lip 120 extending over and bearing against the actuator 18 to securely hold the actuator 18 to the body 28.

Continuing to refer to FIGS. 3 and 4, the first hold-down ring 98 is placed on the lower sealing ring 94. The lower sealing ring 94 is positioned proximate to the lower chamber 112 capturing the edge portion 116 of the first diaphragm 46 between the first hold-down O-ring 98 and the body 28. The spring O-ring 88 is placed in the annular chamber 86 on the sidewalls 84 of the spring housing 78. The spring housing 78 having the spring 90 therein, is inserted into the body 28. The spring 90 bears against the valve stem assembly 40 and the bottom 81. The sidewalls 84 of the spring housing 78 bear against the lower sealing ring 94 holding the edge portion 116 of the first diaphragm 46 on the body 28. The lower cap 80 is attached to the body 28 to retain the base 16 having the spring housing 78 on the body 28.

Referring to FIGS. 1 and 3, a source of pressurized fluid (not shown) is connected to the port 22 to allow fluid communication with the upper piston actuator chamber 66. Plumbing, as required for pumping the fluid, is connected to the first, second and third flow ducts 12, 13, 14 respectively. A leak detector (not shown) is attached to the leak detection port 26 to detect a leak of fluid from the open interior chamber 34 into the actuator 18 or the spring housing 78.

A pressurizing force applied at the port 22 will urge the piston 60 to move axially in the actuator 18 urging the central valve stem assembly 40 to axially move along valve axis A moving the first valve member 42 and second valve member 44 into and out of a closure position with the respective valve seat 36, 38. The first valve seat 36 and second valve seat 38 may be circumferential around the valve axis A and coaxial to each other. Furthermore, the first valve shoulder 50 and second valve shoulder 52 are circumferential around the hollow stem 54 and positioned to engage the first valve seat 36 and second valve seat 38 respectively. Upon release of the pressurizing force at port 22, the resilient force of the spring 90, bearing against the central valve stem assembly 40, may overcome the pressure in the upper piston actuator chamber 66 urging the piston 60 to travel upwardly along valve axis A. This upward movement urged by the spring 90 will cause the central valve stem assembly 40 to move to a first predetermined position as previously discussed. The indicator may be manually depressed by an operator to test the motion of the piston 60 along valve axis A and test the functioning of the valve members 42, 44, respectively, moving into and out of a closure position with the respective valve seats 36, 38.

Figure 6:
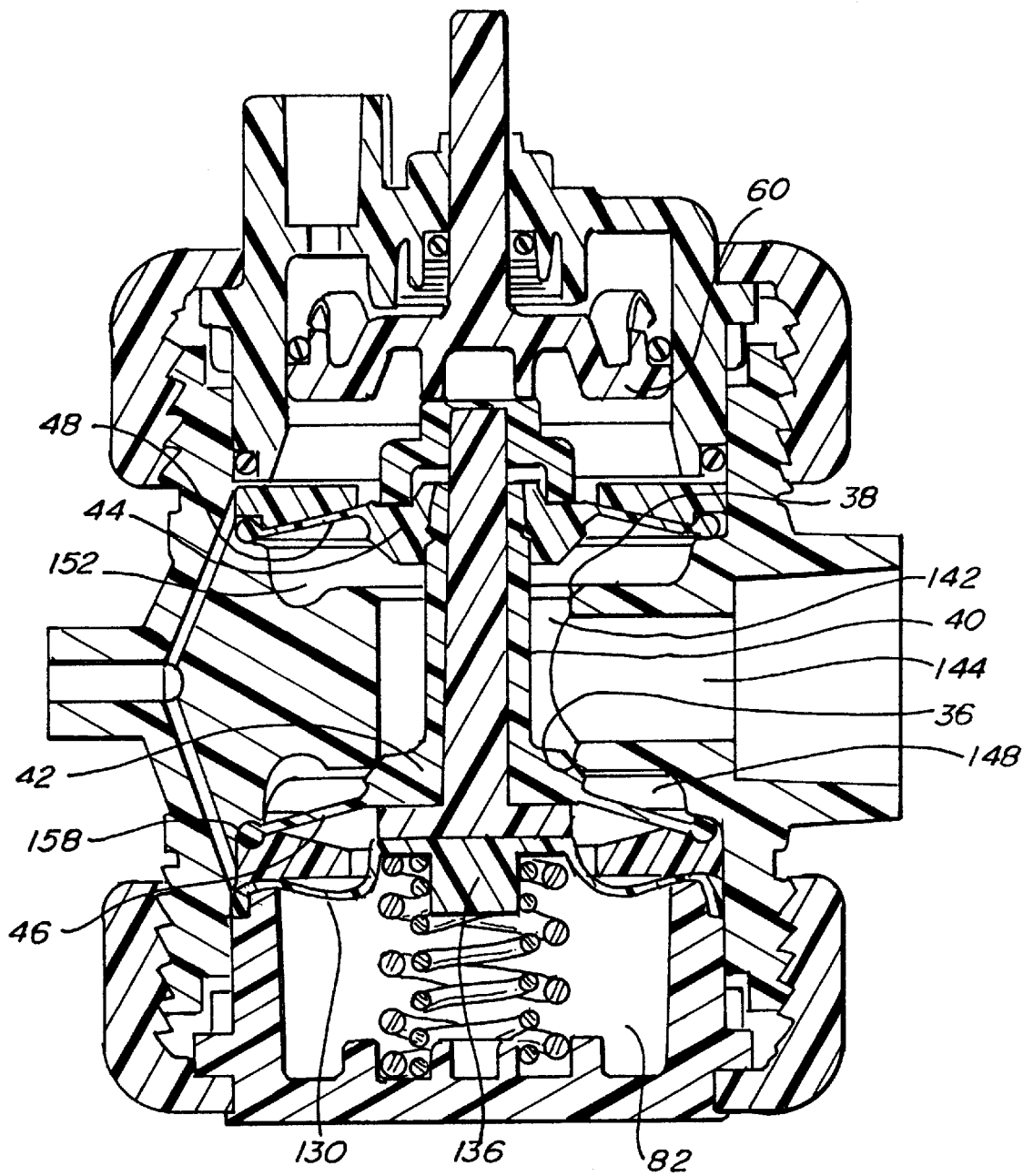
FIG. 6 is a detail section view of a further embodiment of the invention.

Referring to FIG. 6, an additional configuration is shown includes an additional dual containment diaphragm 130 which is integral with the spring engagement member 136 and is sealingly engaged to the valve body.

As shown in this embodiment, the valve body has a first chamber 142 with a first flow duct 144 in communication with said chamber, a second chamber 148 which is in communication with a second flow duct not shown on this view. The first flow duct 142 and the second flow duct 148 are separated from each other by way of the first valve seat 36 and communication between said first chamber and second chamber is controlled by way of the first valve member 42. More specifically by way of actuation of the valve stem assembly by the piston 60.

Continuing to refer to FIG. 6 an additional third chamber 152 is separated from the first chamber 142 by way of the second valve seat 38. Communication between the first chamber and third chamber is controlled by way of the second valve member 44 engaging with said second valve seat 38. The second diaphragm 48 is integral with the second valve member and is sealingly engaged to the valve body thereby preventing any of the fluid in the third chamber from entering the piston cylinder.

This particular embodiment provides the advantage of secondary or dual containment of the metal springs from the fluid flow courses. Thus, if the first diaphragm ruptures or the seal 158 between the first diaphragm and the valve body fails the dual containment diaphragm provides an additional safety factor to prevent contact by the fluid controlled by the valve with the metal spring which could cause contamination in catastrophic damage with respect to the semiconductors being processed by said fluid.

Figure 7:
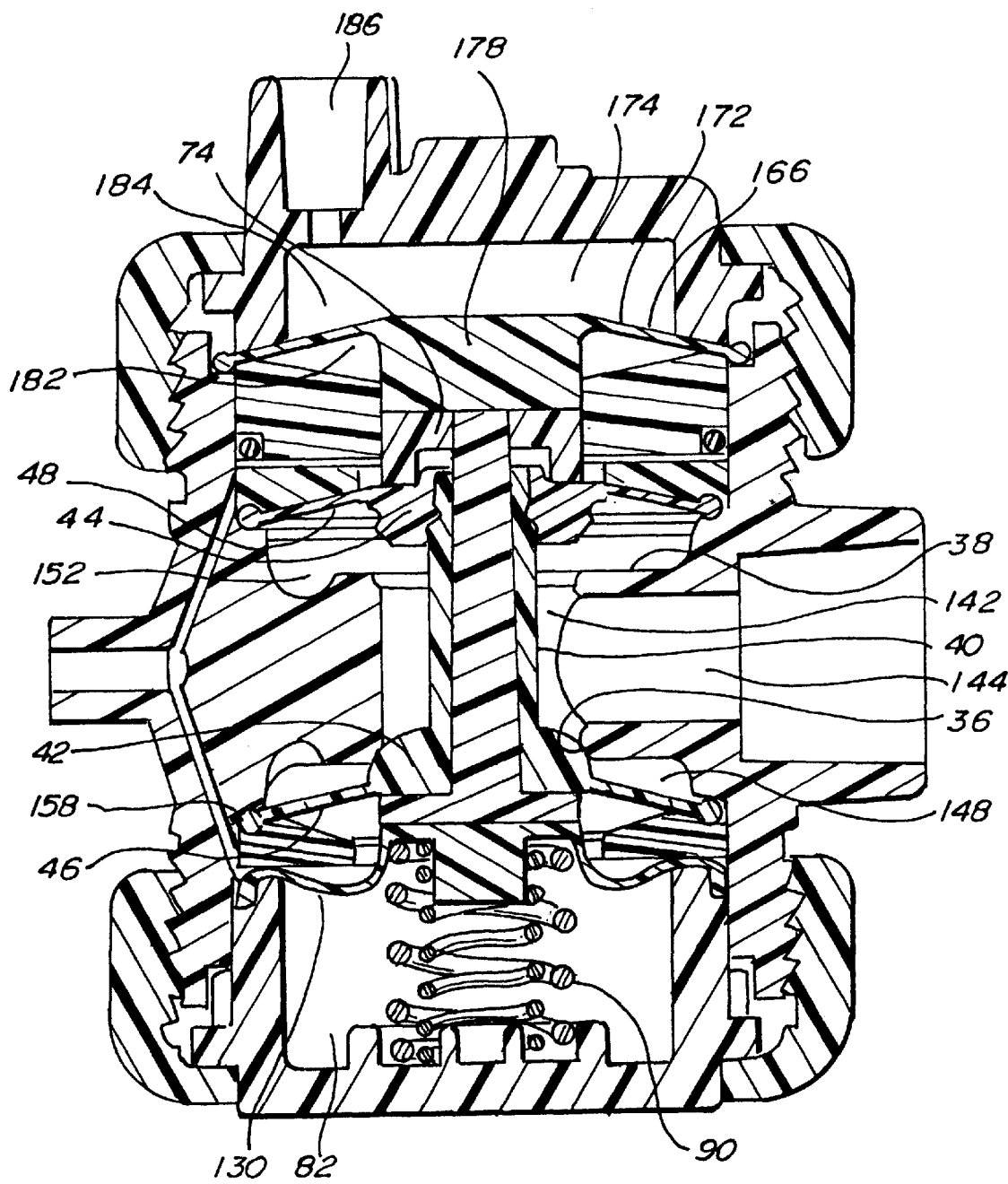
FIG. 7 is a detail section view of a further embodiment of the invention.

An additional embodiment similar to that shown in FIG. 6 is shown in FIG. 7. In this embodiment again there is a dual containment diaphragm 130 to provide an extra barrier for isolation of the spring 90. The actuation means 166 in this case is a moveable actuation diaphragm 172 traversing an actuation chamber 174. The actuation diaphragm 172 has a central actuation portion 178 which engages the nut 74 and the valve stem assembly 40. The valve traverses the valve actuation chamber to define an inner actuation chamber 182 and an outer actuation chamber 184. Pressurization of the outer actuation chamber 184 through the actuation duct 186 will thus urge the actuation diaphragm 172 downward and thus the valve stem assembly downward stopping communication between the first chamber and the third chamber and opening communication between the first chamber and the second chamber.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A plastic diaphragm valve for use with liquids which are highly corrosive to metals, the valve comprising:
   a) a plastic valve body having an axis, a first flow duct, a second flow duct and a third flow duct, all for constraining the fluid which is highly caustic to metal, an open interior chamber in the body in fluid communication with the first flow duct, a first valve seat on the body in the open interior chamber between the first flow duct and the second flow duct, a second valve seat on the body in the open interior chamber between the first flow duct and the third flow duct;
   b) a valve stem assembly movably mounted in the open interior chamber for controlling fluid flow through the valve, the valve stem assembly moveable along the axis and comprising:
      i) a first plastic valve member having an integral first diaphragm extending therefrom and sealingly connected to the valve body, the first plastic valve member movable into and out of a closure position with said first valve seat;
      ii) a second plastic valve member having an integral second diaphragm extending therefrom and sealingly connected to the valve body, the valve member movable into and out of a closure position with said second valve seat;
      iii) a plastic stem connected to the first valve member and the second valve member; and
   c) an actuator engaged with the valve stem assembly to axially move said assembly in the open interior chamber whereby the plastic valve members are moved into and out of their closure positions, the first diaphragm isolating the actuator from fluid in the interior chamber and the first flow duct;
   d) a metallic spring positioned to bias the valve stem assembly in an axial direction, the spring positioned in a spring chamber in the plastic valve body opposite the actuator, the second diaphragm positioned intermediate the metallic spring and the stem thereby providing primary containment of the metallic spring by isolating the metallic spring from fluid in the interior chamber and the second flow duct;
   e) a plastic spring engagement member connected to the spring and connecting to the valve stem, a flexible plastic barrier extending from the spring engagement member and sealingly connecting to the plastic valve body further isolating the metallic spring from fluid in the interior chamber and thereby providing secondary containment of the metallic spring from fluid.

2. The plastic diaphragm valve of claim 1, wherein the valve body is comprised of perfluoroalkoxy.

3. The plastic diaphragm valve of claim 1, wherein the first valve member is integral with the first diaphragm and the second valve member is integral with the second diaphragm.

4. The plastic diaphragm valve of claim 1, wherein the flexible plastic barrier extending from the spring engagement member is integral therewith.

5. The plastic diaphragm valve of claim 1, wherein the metallic spring has a fluoropolymer coating whereby the second diaphragm, the flexible plastic barrier, and the fluoropolyment coating provide three distinct barriers between fluid in the open interior and the metallic spring.

6. A plastic diaphragm valve for highly caustic fluids, the valve providing multiple barriers between a metallic spring and fluids controlled by the valve, the valve comprising:
   a) a fluoropolymer plastic valve body having an axis, a first flow duct, a second flow duct and a third flow duct, an open interior chamber in the body in fluid communication with the first flow duct, a first valve seat on the body in the open interior chamber between the first flow duct and the second flow duct, a second valve seat on the body in the open interior chamber between the first flow duct and the third flow duct;
   b) a fluoropolymer valve stem assembly movably mounted in the open interior chamber for controlling fluid flow through the valve, the valve stem assembly moveable along the axis and comprising:
      i) a first fluoropolymer plastic valve member having an integral first diaphragm extending therefrom and sealingly connected to the valve body, the valve member movable into and out of a closure position with said valve seat;
      ii) a second fluoropolymer plastic valve member having an integral second diaphragm extending therefrom and sealingly connected to the valve body, the valve member movable into and out of a closure position with said valve seat;

iii) a fluoropolymer plastic stem connected to the first valve member and the second valve member; and c) an actuator in the valve body engaged with the valve stem assembly to axially move said fluoropolymer valve assembly in the open interior chamber whereby the plastic valve members are moved into and out of their closure positions, the first diaphragm isolating the actuator from fluid in the interior chamber and the first flow duct;

d) a metallic spring comprised of metal positioned to bias the valve stem assembly in an axial direction, the spring positioned in a spring chamber in the plastic valve body opposite the actuator with respect to the valve stem assembly, the second diaphragm positioned intermediate the metallic spring and the stem thereby providing primary containment of the metallic spring by isolating the metallic spring from fluid in the interior chamber and the second flow duct; and e) a plastic spring engagement member connected to the spring and connecting to the valve stem whereby the spring provides a bias on said valve stem assembly, a flexible plastic barrier extending from the spring engagement member and sealingly connecting to the plastic valve body further isolating the metallic spring from fluid in the interior chamber and thereby providing secondary containment of the metallic spring from fluid, the spring coated with a fluoropolymer thereby providing an additional barrier between the fluids and the metal of the metallic spring.

* * * * *